July 24, 1951 — L. E. GUILLOT — 2,561,921
TRAILER
Filed June 24, 1948 — 3 Sheets-Sheet 1
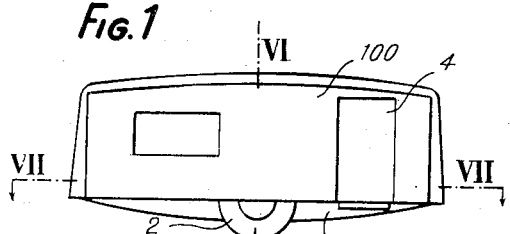
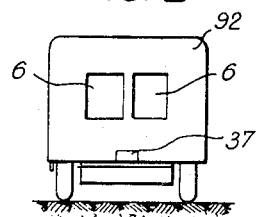
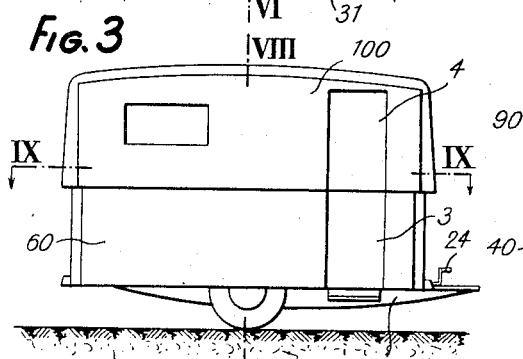
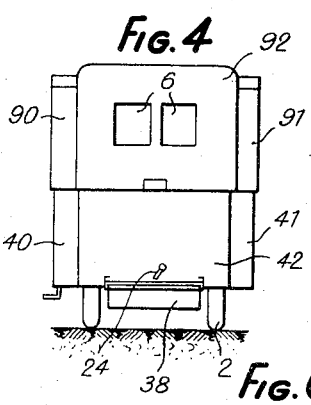
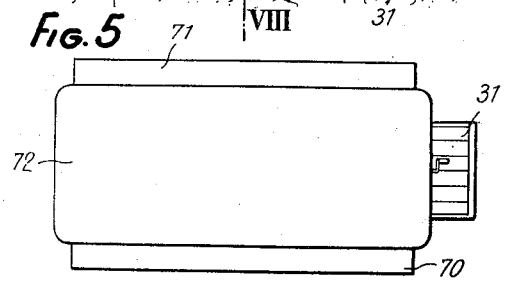
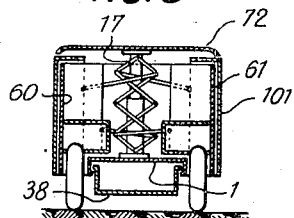
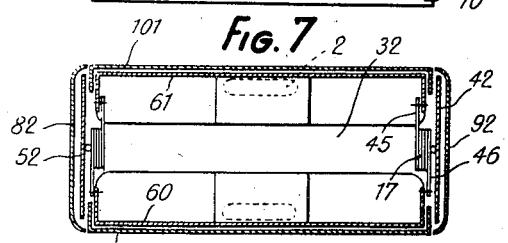
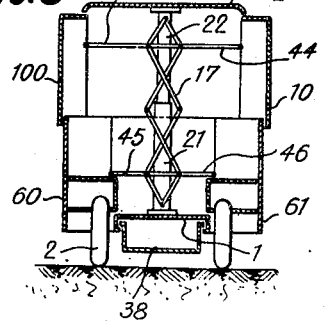
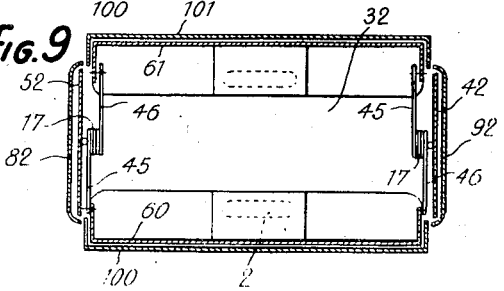

July 24, 1951  L. E. GUILLOT  2,561,921
TRAILER
Filed June 24, 1948  3 Sheets-Sheet 2
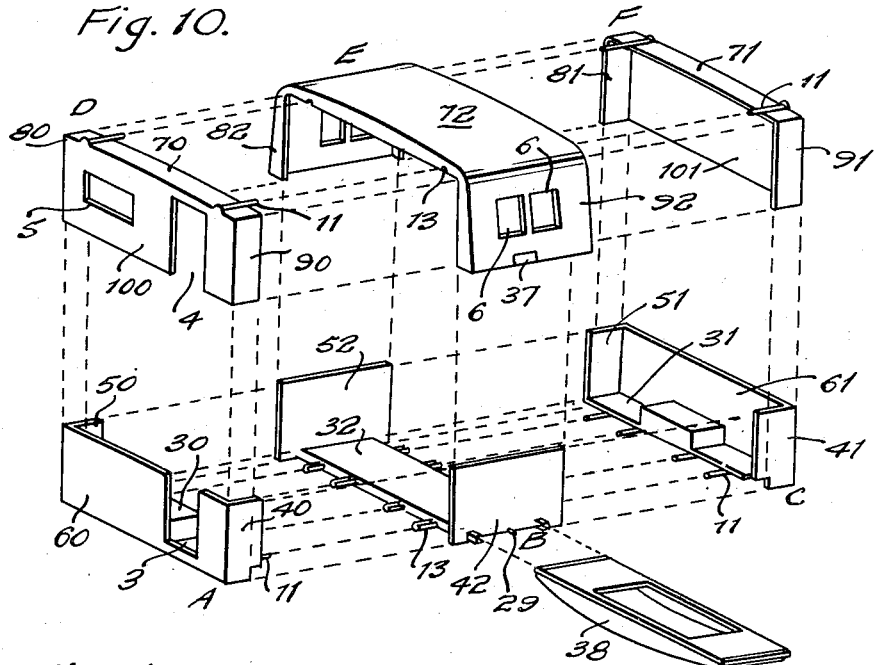
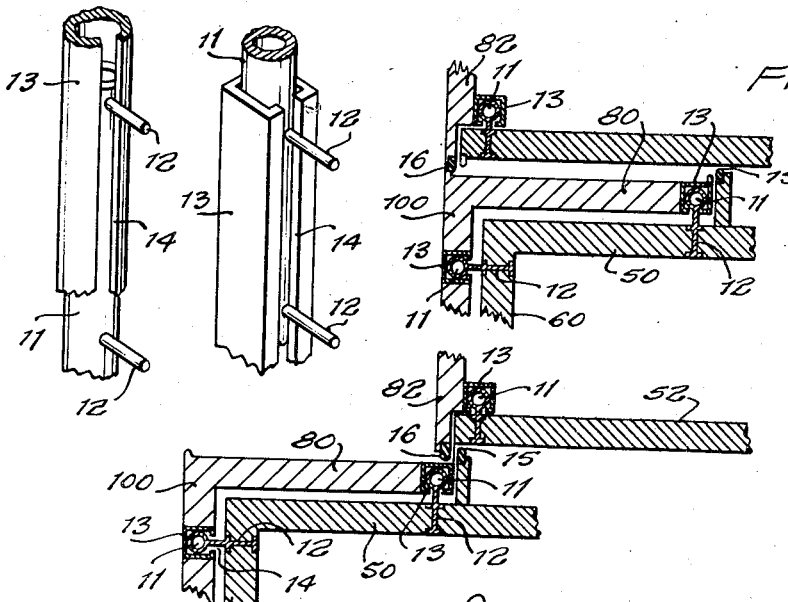
INVENTOR.
Lucien Edonard Guillot
BY July 24, 1951  L. E. GUILLOT  2,561,921
TRAILER Filed June 24, 1948  3 Sheets-Sheet 3

Inventor
Lucien Edouard Guillot

Patented July 24, 1951

2,561,921

UNITED STATES PATENT OFFICE 2,561,921

TRAILER

Lucien Edouard Guillot, Nogent-sur-Marne, France

Application June 24, 1948, Serial No. 34,983
In France June 28, 1947

3 Claims. (Cl. 296—23)

The object of my invention is a trailer of adjustable length for camping of which the component parts are connected together by a watertight sliding device that makes them extend through a simultaneous movement at one and the same time in the lateral direction and in a perpendicular direction with the object of reducing as much as possible the bulk and consequently the drag in the trailing position and, on the other hand, of obtaining as large as possible living quarters while it is in use.

The expansible trailer according to my invention provides a combination of carrier wheels, a frame connected to the wheels by means of springs, a lower fixed part formed by a floor carried by the frame and rigid with a front wall and with a rear wall, both being of a height less than the height of the living quarters of the trailer in its expanded position, an upper medial part adapted to slide vertically in relation to the fixed lower part and provided with a roof fixed rigidly with a front wall and with a rear wall, both being of a height less than the height of the living quarters of the trailer in its expanded spread out position and being spaced so that the upper medial part covers the lower fixed part after the manner of a box lid, further two lower symmetrical side members, adapted to slide horizontally in relation to the lower fixed member and formed by a floor located above the floor of the lower fixed member and rigid, on the one hand, with a side wall of substantially the same height as the front and rear walls of the fixed member, provided with at least one opening forming a bay-window and, on the other hand, with two walls at right angles adapted to be inserted between the front and rear walls of the lower fixed member. The trailer includes further two symmetrical upper side members adapted to slide vertically in relation to the corresponding lower side members and horizontally in relation to the upper medial member and formed by a side wall of a height slightly less than that of the walls of the upper medial member and provided with at least one opening constituting a bay-window located in register with the above mentioned one for increasing its surface, in the expanded position of the trailer, last mentioned side wall being fixed rigidly, on the one hand, with two walls at right angles intended to be inserted respectively between one of the walls of the fixed member and the corresponding wall at right angles on the lower side member and, on the other hand, with a roof connecting the two walls at right angles and adapted to form a sideways extension, in the expanded position of the roof, of the upper medial member, means ensuring simultaneously the vertical sliding of the upper members in relation to the lower members and the horizontal sliding of the side members in relation to the medial members, means guiding the movable members during their sliding movement in relation to the fixed members and means ensuring the watertightness in the two extreme positions of expansion and reduction to the smallest bulk.

A better understanding will be obtained of my invention with the help of the accompanying drawings, given as an example.

Fig. 1 is an elevational diagrammatic view looking at the trailer when reduced to the lowest bulk for travelling over the road.

Fig. 2 is an elevational rear view of it.

Fig. 3 is a view similar to Fig. 1 showing it in its fully expanded position or "camping" position.

Fig. 4 is a corresponding elevational rear view of it.

Fig. 5 is a plan of it seen from above.

Figs. 6 and 7 are diagrammatic views in vertical and horizontal sections, made respectively along the lines VI—VI and VII—VII of Fig. 1.

Figs. 8 and 9 are likewise sectional diagrammatic views, made respectively along the lines VIII—VIII and IX—IX of Figs. 3 and 4.

Fig. 10 illustrates, viewed separately, in perspective, the component members of the trailer.

Figs. 11 and 12 illustrate two possible forms of execution of the linking and sliding devices for the component members.

Fig. 13 is an enlarged part section similar to that of Fig. 7, showing the means ensuring watertightness between the component members, these members being assumed to be in their unexpanded position or road-going position.

Fig. 14 is an enlarged part sectional view similar to that of Fig. 9, showing this same device with the actual members in expanded position or position when trailer is at camping site.

Figure 15:
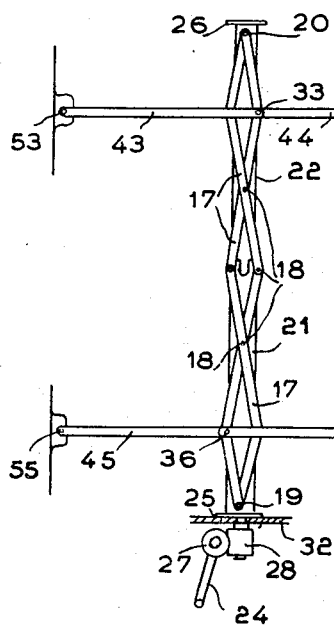
Figs. 15, 16, 17 and 18 illustrate a device that may be used for executing the simultaneous control of the sliding members.
Figure 16:
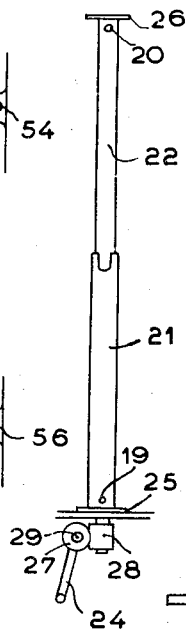
Figure 17:
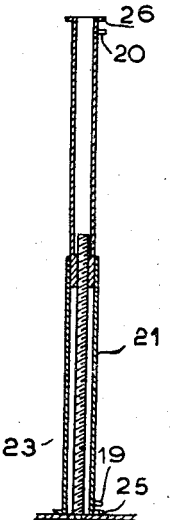

The trailer according to the invention comprises a frame 1 (Figs. 6, 8 and 10), assembled on two wheels 2, that are independent or otherwise and carry three lower members A B C (Fig. 10). The member A is provided with a flooring 30, two end walls 40 and 50 and a side wall 60 provided with a door frame; the member C is provided likewise with a flooring 31, two end walls 41 and 51 and a side wall 61; and the intermediate member B is provided with a flooring 32 and two end walls 42 and 52.

On these members are fitted, by a vertical sliding movement, three corresponding members D—E—F (Fig. 10). The member D is provided with a roofing 70, two end walls 80 and 90 and a side wall 100 provided with an opening 4 registering with the door opening 3 and an opening 5 making up a window. The member F is provided with a roof 71, two end walls 81 and 91 and a side wall 101, and the intermediate member E is provided with a roof 72 and two end walls 82 and 92, the latter being provided with two windows 6.

The members A and C fit, by a horizontal sliding movement, in the intermediate member B, while the upper members D and F fit similarly, by a sliding movement, in the intermediate member E.

The sliding motion of these members may be obtained for instance by means of suitable guides.

In the embodiment illustrated in Fig. 11, the guides are made up of two round tubes, sliding in one another with an easy fit. The various inner tubes 11 of the guides are fastened to the lower portion of the members A and C and to the upper portion of the members D and F, for instance by means of threaded bolts 12. The outer tubes 13 are provided with a longitudinal opening 14 intended for the passage of these bolts, and are fastened respectively to the lower portion of the intermediate member B and to the upper portion of the intermediate member E.

As may be seen in Fig. 12, one of the tubes 11 may be round in section and the other 13 of square section.

The two devices illustrated in Figs. 11 and 12 are fitted with a certain amount of side play simplifying the building of the whole assembly.

Use is made of a set up carried out with a similar device for ensuring the vertical sliding motion of the members E and D on the members B and A (see Figs. 13 and 14). These figures show likewise an arrangement given merely as an example, intended to ensure watertightness between the component members as explained above. This device consists of joints or liner strips 15 and 16, of rubber or other suitable material, acting as well when the trailer is reduced to the smallest possible bulk (Fig. 13) as when it is fully expanded (Fig. 14).

The assembly of the upper portion of the trailer made up of the members D—E—F and the horizontal sliding motion of the members A—C and D—F may be obtained simultaneously by any suitable means, for instance by means of the toggle system illustrated in Figs. 15 to 18.

This system comprises an assembly of cross arms 17 hinged at 18 so as to form parallelograms that can change their shape, of which the two end apices are hinged respectively at 19 and 20 on the lower fixed element 21 and on the upper element 22 of a jack of which the baseplate 25 is fixed rigidly with the member B and the head 26 is rigid with the upper member E.

The side hinges 33—34—35 and 36 are connected (Figs. 15 and 18) by links 43—44—45 and 46 with points 53—54—55 and 56 respectively belonging to one of the upper members, to the second upper member, to the lower side member corresponding to the first of the said members and finally to the second lower side member.

Figure 18:
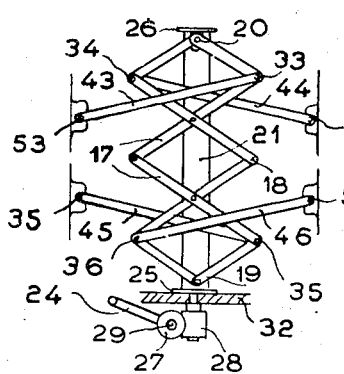

When the jack is brought from the collapsed or lowered position illustrated in Fig. 18 to the expanded position illustrated in Fig. 15, the member E is raised vertically and pushed away from the fixed member B, while simultaneously through the play of the crossarms and the rods 43 and 44, on the one hand and 45 and 46 on the other hand, the upper members D and F are at one and the same time raised and pushed apart from each other and the lower members A and C are merely pushed apart laterally from the fixed member B.

The various component members are, during these movements, guided by the system of slides as explained or by any device of a similar nature.

With the object of making available as soon as possible the inside of the trailer, the control device outlined above will be duplicated and placed at the end of the trailer. The simultaneous control of the two jacks will be obtained, for instance by means of two sets of worm wheels 27 and 28, the wheels 27 being fastened to a common transmission shaft 29 carried by the frame 1 and of which one end is made up so as to carry a removable control crank handle 24. The positioning of this crank handle is only possible after the opening of a small door 37 (Figs. 2 and 10) closing an aperture cut in the corresponding lower portion of the wall 92 of member E. This arrangement makes the whole system free from interference.

Figure 19:
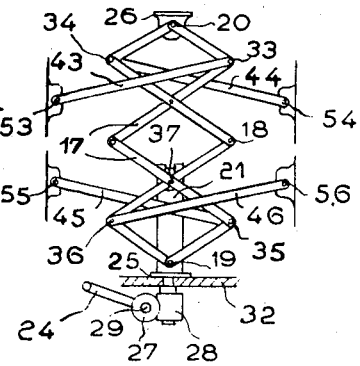
Fig. 19 illustrates a modification of Fig. 18.

With the object of reducing the size of the jack, its upper movable element may be connected to an intermediate hinge joint 37 of the toggle system (Fig. 19), the head 26 on the upper element E being always hinged to the apex 20 of the toggle system.

The jacks may be controlled in any suitable way for instance mechanically, hydraulically or by air.

If the suspension of the trailer is of the independent wheel type, the frame 1 may be designed so as to take, by endwise sliding a boat 38 of which the longitudinal edges will carry on their outside suitable brackets or flanges for supporting purposes.

This boat may be withdrawn from its housing only after the operation of the expanding system of the trailer, inasmuch as the member E covers its ends, in the completely folded or collapsed position (Figs. 1 and 2) of the trailer.

In this position, the wheels 2 likewise cannot be tampered with.

The interior fittings of the trailer will be designed so that the various movements of the members are not obstructed. The furniture especially will be fixed rigidly with the movable parts and follow the latter in their various movements.

What I claim is:

1. An expansible trailer body having an upper case and a lower case, each including a central member and two side members arranged and dimensioned so as to telescopically fit one into the other, comprising in combination, a toggle mechanism including a plurality of bars pivoted in pairs for forming parallelograms; said toggle mechanism connecting the upper central member to the lower central member; and four rods connecting, respectively, the lateral pivots of the uppermost and lowermost parallelograms of said toggle mechanism to the side members arranged on opposite sides with respect to the vertical axis of said toggle mechanism.

2. An expansible trailer body having an upper case and a lower case, each including a central member and two side members arranged and dimensioned so as to telescopically fit one into the other, comprising in combination, a toggle mechanism including a plurality of bars pivoted in pairs for forming parallelograms; said toggle mechanism connecting the upper central member to the lower central member; four rods connecting, respectively, the lateral pivots of the uppermost and lowermost parallelograms of said toggle mechanism to the side members arranged on opposite sides with respect to the vertical axis of said toggle mechanism; and a jack for increasing and reducing the height of said toggle mechanism, the uppermost axial pivot of the set of parallelograms of said toggle mechanism being connected to the upper end of said jack, the upper end of said jack being connected to the upper case of the trailer body, the lower axial pivot of the set of parallelograms of said toggle mechanism being connected to the lower stationary end of said jack.

3. An expansible trailer body having an upper case and a lower case, each including a central member and two side members arranged and dimensioned so as to telescopically fit one into the other, comprising in combination, a toggle mechanism including a plurality of bars pivoted in pairs for forming parallelograms; said toggle mechanism connecting the upper central member to the lower central member; four rods connecting, respectively, the lateral pivots of the uppermost and lowermost parallelograms of said toggle mechanism to the side members arranged on opposite sides with respect to the vertical axis of said toggle mechanism; a jack for increasing and reducing the height of said toggle mechanism, a member connected to the upper case of the trailer body, said member being pivoted to the uppermost axial pivot of the set of parallelograms of said toggle mechanism, the lowermost axial pivot of the set of parallelograms of said toggle mechanism being connected to the lower stationary end of the jack; and an intermediate axial pivot of the set of parallelograms of said toggle mechanism, said intermediate axial pivot being connected to the upper end of said jack.

LUCIEN EDOUARD GUILLOT.

REFERENCES CITED

The following references are of record in the file of this patent:

UNITED STATES PATENTS

| Number | Name | Date |
| --- | --- | --- |
| 1,436,984 | Follett | Nov. 28, 1922 |
| 1,596,924 | Curtis | Aug. 24, 1926 |
| 1,964,894 | Rohne | July 3, 1934 |
| 1,972,415 | Anderson | Sept. 4, 1934 |
| 2,190,091 | Wolfe | Feb. 13, 1940 |
| 2,343,261 | Marple | Mar. 7, 1944 |
| 2,452,938 | Krake | Nov. 2, 1948 |

FOREIGN PATENTS

| Number | Country | Date |
| --- | --- | --- |
| 278,879 | Great Britain | Oct. 20, 1927 |